(12) United States Patent
Sankar et al.

(10) Patent No.: US 8,631,280 B2
(45) Date of Patent: Jan. 14, 2014

(54) METHOD OF MEASURING AND DIAGNOSING MISBEHAVIORS OF SOFTWARE COMPONENTS AND RESOURCES

(75) Inventors: Raji Sankar, Bangalore (IN); Govinda Raj Sambamurthy, Bangalore (IN); Rahul Goyal, Bangalore (IN); Ashwin Kumar Karkala, Bangalore (IN); Sandeep Pandita, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 359 days.

(21) Appl. No.: 13/009,777

(22) Filed: Jan. 19, 2011

(65) Prior Publication Data

US 2012/0185732 A1 Jul. 19, 2012

(51) Int. Cl.
*G06F 11/00* (2006.01)

(52) U.S. Cl.
USPC .................. 714/38.12; 717/127; 717/128

(58) Field of Classification Search
None
See application file for complete search history.

(56) References Cited

U.S. PATENT DOCUMENTS

| | | | |
|---|---|---|---|
| 5,222,065 A * | 6/1993 | Krogmann | 714/38.12 |
| 5,257,358 A * | 10/1993 | Cohen | 714/38.12 |
| 5,958,009 A | 9/1999 | Friedrich et al. | |
| 6,018,300 A | 1/2000 | Dowden et al. | |
| 6,049,666 A | 4/2000 | Bennett et al. | |
| 6,792,460 B2 | 9/2004 | Oulu et al. | |
| 6,954,779 B2 | 10/2005 | Duggan et al. | |
| 7,020,802 B2 | 3/2006 | Gross et al. | |
| 7,237,023 B2 | 6/2007 | Menard et al. | |
| 8,205,116 B2 | 6/2012 | Yang et al. | |
| 8,219,997 B2 * | 7/2012 | Shimizu et al. | 718/104 |
| 2001/0034663 A1 | 10/2001 | Teveler et al. | |
| 2005/0172306 A1 * | 8/2005 | Agarwal et al. | 719/328 |
| 2005/0216781 A1 | 9/2005 | Doshi et al. | |
| 2008/0115143 A1 * | 5/2008 | Shimizu et al. | 718/105 |
| 2011/0145651 A1 * | 6/2011 | Molnar et al. | 714/38.1 |
| 2012/0216205 A1 | 8/2012 | Bell, Jr. et al. | |
| 2012/0284719 A1 * | 11/2012 | Phan et al. | 718/101 |
| 2012/0304182 A1 * | 11/2012 | Cho et al. | 718/102 |

* cited by examiner

*Primary Examiner* — Christopher McCarthy
(74) *Attorney, Agent, or Firm* — Fliesler Meyer LLP

(57) ABSTRACT

Systems and methods are described for diagnosing behavior of software components in an application server. The application server can comprise a plurality of components that process incoming requests. A diagnostics advisor can be deployed with the application server and can determine an efficiency and/or inefficiency of each of the components of the application server or other middleware system. The efficiency determined by computing a ratio of the number of requests that completed execution during a particular sampling time period to the number of requests that were received. The inefficiency is the ratio of the number of requests that are still being executed at the end of the sampling time period to the number of requests that were received. The diagnostics advisor employs the determined efficiency and/or inefficiency to diagnose a misbehavior or other problem of the components in the application server.

20 Claims, 7 Drawing Sheets

METHOD OF MEASURING AND DIAGNOSING MISBEHAVIORS OF SOFTWARE COMPONENTS AND RESOURCES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following U.S. Patent Applications, each of which is incorporated by reference herein in its entirety:

U.S. patent application Ser. No. 13/009,775, entitled "SYSTEM AND METHOD FOR DETERMINING CAUSES OF PERFORMANCE PROBLEMS WITHIN MIDDLEWARE SYSTEMS", by Govinda Raj Sambamurthy et al., filed on Jan. 19, 2011;

U.S. patent application Ser. No. 13/009,788, entitled "SYSTEM AND METHOD FOR USING DEPENDENCY IN A DYNAMIC MODEL TO RELATE PERFORMANCE PROBLEMS IN A COMPLEX MIDDLEWARE ENVIRONMENT", by Govinda Raj Sambamurthy et al., filed on Jan. 19, 2011;

U.S. patent application Ser. No. 13/009,781, entitled "EFFICIENT DATA COLLECTION MECHANISM IN MIDDLEWARE RUNTIME ENVIRONMENT", by Raji Sankar et al., filed on Jan. 19, 2011; and U.S. patent application Ser. No. 13/009,800, entitled "SYSTEM AND METHOD FOR PROVIDING A STATIC MODEL MAP OF BEHAVIORS IN A MIDDLEWARE SYSTEM, FOR USE IN IDENTIFYING SYSTEM PROBLEMS" by Raji Sankar et al., filed on Jan. 19, 2011.

FIELD OF INVENTION

The current invention relates generally to software diagnostics and middleware systems, and more particularly to diagnosing behavior of software components in a multi-component middleware system.

BACKGROUND

In recent years, an increasing number of e-commerce providers and business enterprises have come to rely on middleware and application server technology as the lifeblood of their business. For example, application servers form a proven foundation for supporting e-commerce applications, providing the presentation, business and information-access logic, security and management services, and underlying infrastructure needed for highly scalable and mission-critical software applications. These servers manage all of the underlying complexities of a company's applications, allowing the organization to focus instead on delivering new and innovative products and services.

With the rising use and pervasiveness of such middleware systems, it has become important for business enterprises to diagnose and resolve various errors, misbehaviors and other problems that may occur in this field. For example, a middleware system, such as an application server, typically uses multiple components and resources working together to service an incoming request. A problem in the higher level service, can be a manifestation of a misbehavior in any of the under lying components or resources servicing the request. But the converse is not true, i.e., a misbehavior of a resource/component need not necessarily indicate a problem in the service. Hence in order to diagnose a problem it is often useful to relate back misbehaviors in different components/resources to the overall service provided to a user and tie it with a problem viewed by the user. It is typical for misbehavior in more than one component/resource to contribute to the problem.

As an illustration, an expense report request can be serviced by a combination of Servlets, Enterprise Java Beans (EJBs) and data sources. The slow performance of expense report request can be due to a missing index in one of the tables accessed through the data source, but a missing index need not cause the expense report to be slow performing. In addition, a slow performance can be due to wrong code in the EJB and a missing index for a table.

In many cases, it would be advantageous to compute performance at each of the components or points of the middleware system, and to identify whichever point is not performing well as the problem point. However, there is no standard way of measuring misbehavior of components/resources. Every component/resource has different parameters by which misbehavior can be measured. Given that all misbehavior need not contribute to a problem, it becomes helpful to understand to differentiate between the different misbehaviors and prioritize them against the overall middleware system problem. This may not be possible when different measurements are used. Thus, what is desirable is a common measurement ground to measure misbehavior of different components/resource

SUMMARY

In various embodiments, systems and methods are described for diagnosing behavior of software components in an application server. The application server can comprise a plurality of components that process incoming requests. A diagnostics advisor can be deployed with the application server and can determine an efficiency and/or inefficiency of each of the components of the application server or other middleware system. The efficiency is determined by computing a ratio of a number of requests that completed execution in the component during a particular sampling time period to the number of requests that were received by the component during the sampling time period. The inefficiency is the inverse of efficiency, i.e. it is a ratio of the number of requests that are still being executed by the one or more components at the end of the sampling time period to the number of requests that were received by the one or more components during the sampling time period. The diagnostics advisor employs the determined efficiency and/or inefficiency to diagnose a misbehavior or other problem of the components in the application server.

DETAILED DESCRIPTION

Figure 1:
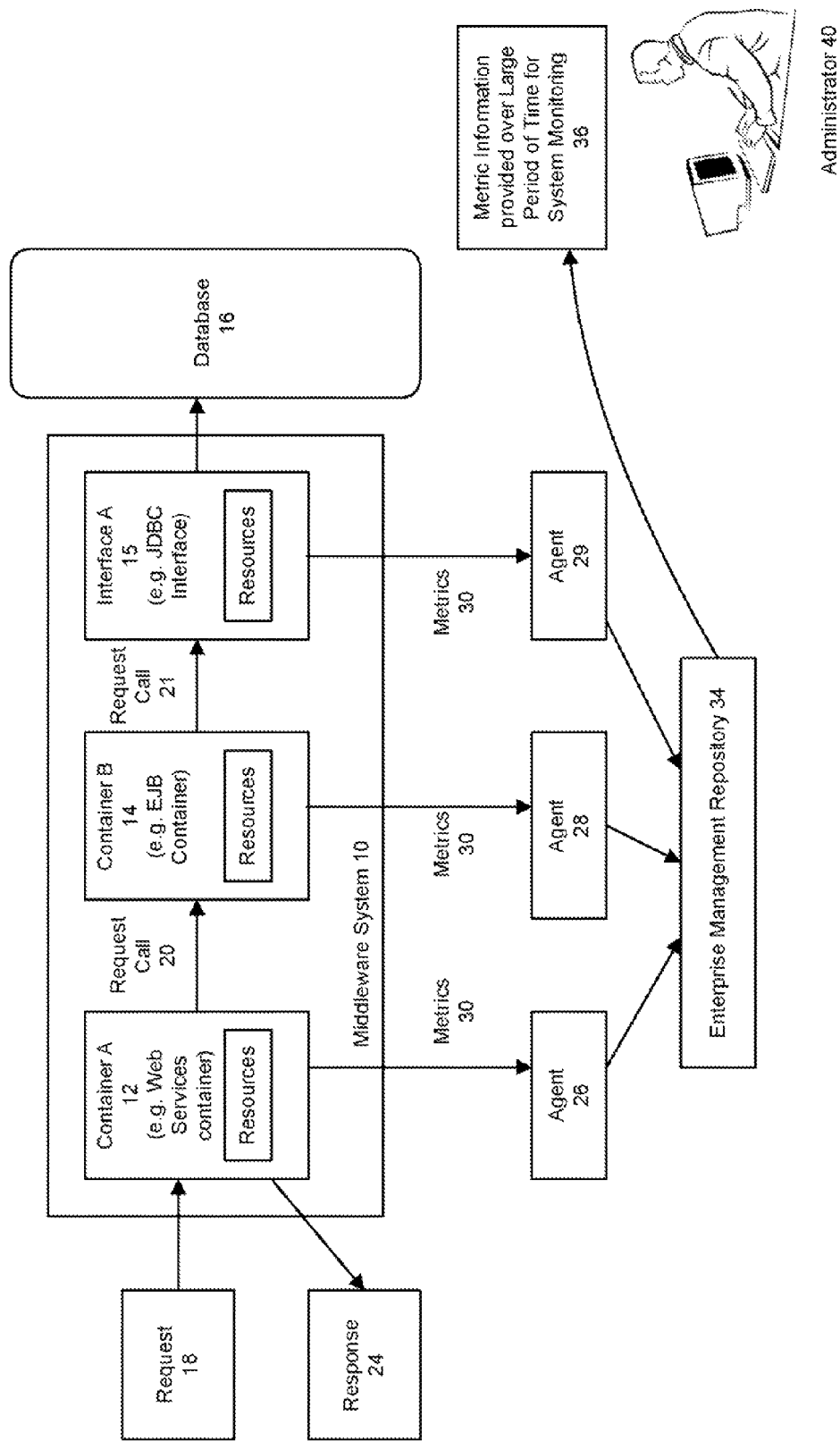
FIG. 1 illustrates a system, such as a middleware system, in accordance with an embodiment of the invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In accordance with various embodiments, the methods and techniques for measuring and diagnosing software misbehavior can be implemented in a software middleware system, such as an application server. Other types of middleware systems can also be utilized in conjunction with the various embodiments described herein, such as web servers, business process management (BPM) and process execution systems, enterprise service buses, service access gateways, messaging brokers and messaging systems, and the like.

Definitions

In accordance with an embodiment, as used herein, the term "efficiency" is used to refer to a computation with no units, and normalized against load. It is defined as the ratio of the number of requests in this sampling period that completed execution within the sampling period to the total number of requests that came in for processing in this sampling period. Though it is normalized against load, it will vary with load if load affected the behavior of the component and stay constant if not.

In accordance with an embodiment, as used herein, the term "inefficiency" is used to refer to the inverse of efficiency. It is defined as the ratio of the number of requests in this sampling period that is still executing at the end of this sampling period to the total number of requests that came in for processing in this sampling period.

In accordance with an embodiment, as used herein, the terms "performance indicator," "performance metric" and/or "performance indicator/metric" are used interchangeably to refer to any metric characterizing the response time, throughput or load on hardware or software components in a system.

In accordance with an embodiment, as used herein, the term "bottleneck" is used to refer to any situation in which performance of a system is diminished or otherwise compromised due to the poor performance of one or more components. The component or components causing the bottleneck are referred to herein as "bottleneck components."

In accordance with an embodiment, as used herein, the term "model" is used to refer to a hierarchical representation of the relations between components within middleware systems. A model can include a static hierarchy of component types, which is predefined or predetermined during the design phase, and dynamic relations, which are established between component instances during runtime.

In accordance with an embodiment, as used herein, the term "problem tree" is used to refer to a runtime instance of a model, represented as a tree of related components that exhibit performance problems at runtime. The components in a problem tree may or may not be "effects" of one another.

In accordance with an embodiment, as used herein, the term "link probability" is used to refer to a measure of co-occurrence of performance problems within components, which are known to be related to each other, by virtue of their links in a problem tree.

FIG. 1 illustrates a system, such as a middleware system, in accordance with an embodiment. As shown in FIG. 1, a typical middleware system 10 includes a plurality of resources, which in turn can be provided within containers 12, 14, such as Web Services or EJB containers, or as interfaces 15, such as a JDBC interface. A typical middleware system can also include a database 16, or provide access to one or more external databases. When a request 18 is received at the system, these resources are successively called or otherwise used 20, 21, to allow the system to eventually respond 24 to the request. Typically, individual resource usage information can be collected from the containers and interfaces by a plurality of agents 26, 28, 29 that are associated with the various containers and interfaces. The resource usage information or metrics 30 can be stored or otherwise provided to an enterprise manager repository 34. The information in the enterprise manager repository thus reflects an overview of metric information for the system over a relatively large period of time 36, and as such is useful for system monitoring by a system administrator 40. However, this form of metric information is of less use in identifying system problems when they occur.

Figure 2:
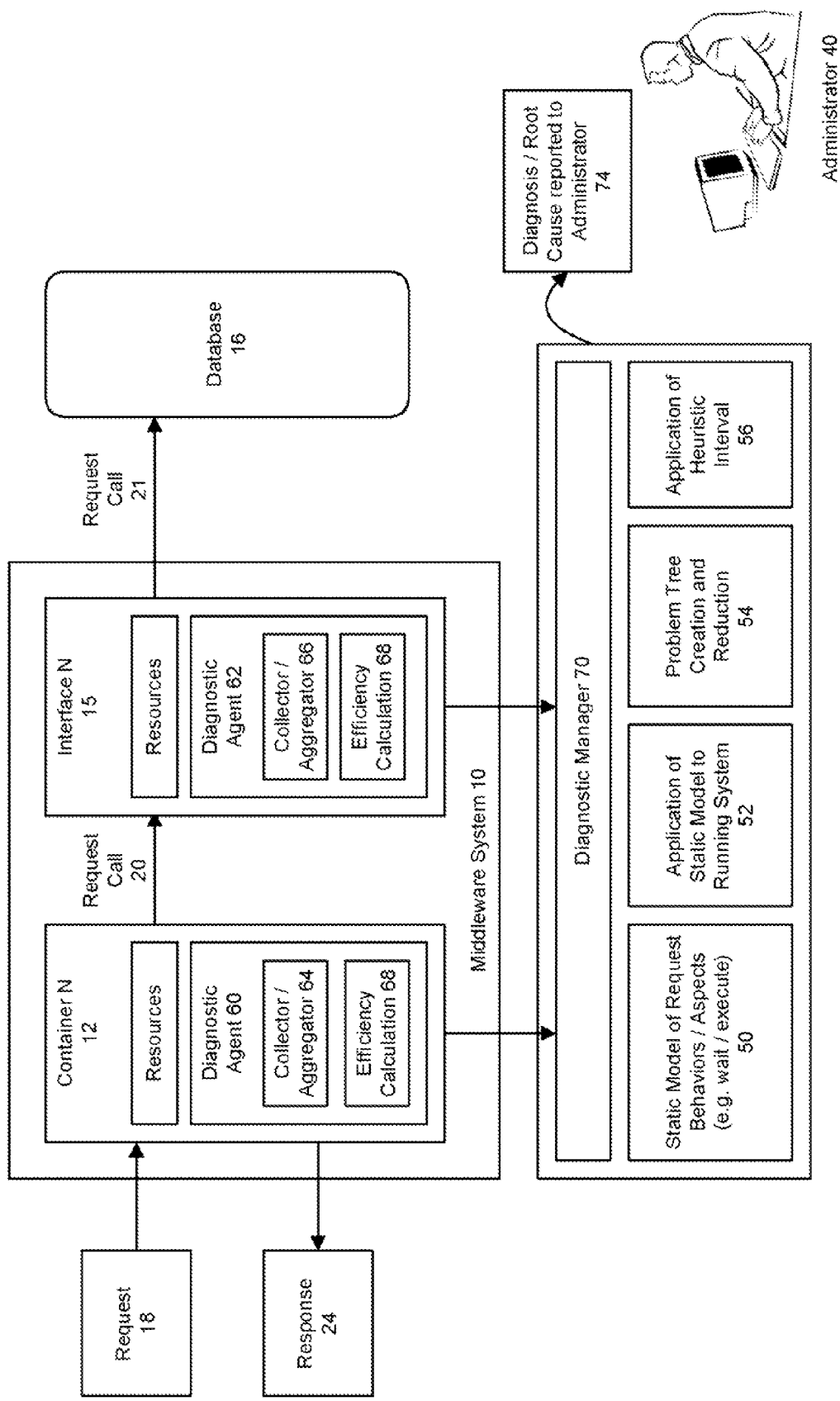
FIG. 2 illustrates a more detailed view of a system, such as a middleware system, in accordance with an embodiment of the invention.

FIG. 2 illustrates a more detailed view of a system, such as a middleware system, in accordance with an embodiment. As shown in FIG. 2, the middleware system again includes a plurality of resources provided, e.g. as containers or interfaces, and again includes or provides access to one or more databases. In accordance with an embodiment, the system can allow definition of one or more of a static model of request behaviors 50, and allow application of the static model 52, to define behaviors within the current system configuration that are of most interest in problem identification (such as potential resource bottlenecks, or patterns of resource behavior that indicate potential problems). In accordance with an embodiment, a plurality of diagnostic agents 60, 62, coupled with collector/aggregators 64, 66, and a diagnostic manager 70, can provide information describing the runtime "efficiency" of a particular resource, within the context of this system. This information can then be used in combination with a problem tree 54, and heuristic interval 56, to provide diagnosis or the "root cause" 74 of a particular current system problem to the system administrator.

As described above, middleware systems are typically comprised of multiple components that continuously service incoming requests. For example, a request can be processed by a plurality of servlets, Enterprise JavaBeans (EJBs) and data sources. In this case, a request potentially goes through several stages of processing such as:

Thread pool wait
EJB wait
EJB execution
JDBC connection pool wait
JDBC execution A problem in any of these execution points and waits can manifest itself as a slow performance of requests at the application server level. Hence it can be advantageous to compute performance at each of these points, and which ever point is not performing well, can be indicated as the problem point. The performance measures at each of these points can be illustrated as follows:

Thread pool wait: Average time spent waiting
EJB wait: Average time spent waiting
EJB execution: Time spent in execution
JDBC connection pool wait: Time spent waiting
JDBC execution: Time spent executing Time spent in execution in most cases, will depend on application logic and time spent in down stream components. It is usually not feasible or practical to compare wait time to execution time. Hence there is a problem of comparing performance of individual points in the application server system.

There is no standard way of measuring misbehavior of components/resources. Every component/resource has different parameters by which misbehavior can be measured. Given that all misbehavior need not contribute to a problem, it becomes useful to understand to differentiate between the different misbehaviors and prioritize them against the overall middleware system problem. This may not be possible when different measurements are used. Hence it becomes desirable to have a common measurement ground which can be used to measure misbehavior of different components/resource which easily relates to the middleware system performance measured.

One measure commonly used to measure performance is throughput. Throughput also varies by load. Hence a small throughput can be indicative of a low load or a low performance. However, to differentiate between the two scenarios and hence set a threshold for throughput is often impractical.

Another such commonly used measure is response time. Response time requirements vary with implementation of components. Some components are supposed to inherently take substantially less time than others. For example, getting an EJB object from a Java object pool should be in the order of micro seconds since it is within the application server, while other components, such as executing a database call, are usually significantly longer and may need to be measured in the order of milliseconds since it has to make a remote call. Thus, to identify the behavior of a component and set a threshold for the response time of the component can also be impractical.

In light of the above, what is desirable is a normalized parameter that is independent of behavior of component and load and which indicates the performance of the component and can be compared against similar thresholds and compared against the overall threshold required for the middleware system performance.

In accordance with an embodiment, a parameter independent of the load and behavior of component is provided to represent a performance problem in a component. The proposed common measure is called efficiency/inefficiency, one being the inverse of other. Which one is calculated is based on the category of behavior of component analyzed. Efficiency can be defined as the processing power of a given component and inefficiency as the retention power of any given component.

In accordance with an embodiment, the processing/retention power is computed for a time interval in which the component is monitored and this is called the sampling period. It should be noted that as the deviation of resonance of the sampling period increases from the expected processing time, the margin of error in performance that can be detected decreases.

In accordance with an embodiment, efficiency is a computation with no units and normalized against load. It can be defined as the ratio of the number of requests in this sampling period that completed execution within the sampling period to the total number of requests that came in for processing in this sampling period. Though it is normalized against load, it will vary with load if load affected the behavior of the component and stay constant if not.

In accordance with an embodiment, inefficiency is the inverse of efficiency. It is defined as the ratio of the number of requests in this sampling period that is still executing at the end of this sampling period to the total number of requests that came in for processing in this sampling period.

Figure 3:
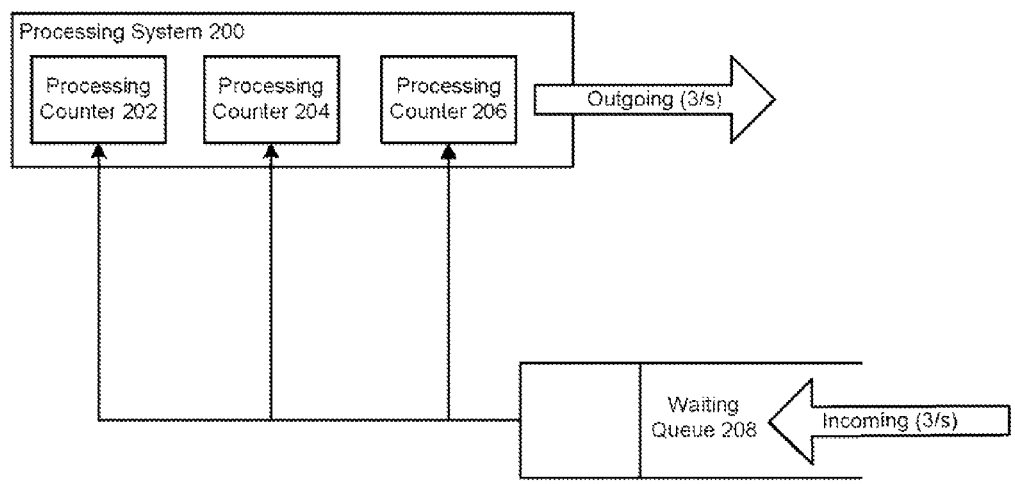
FIG. 3 is an illustration of measuring efficiency and/or inefficiency, in accordance with various embodiments of the invention.
Figure 4:
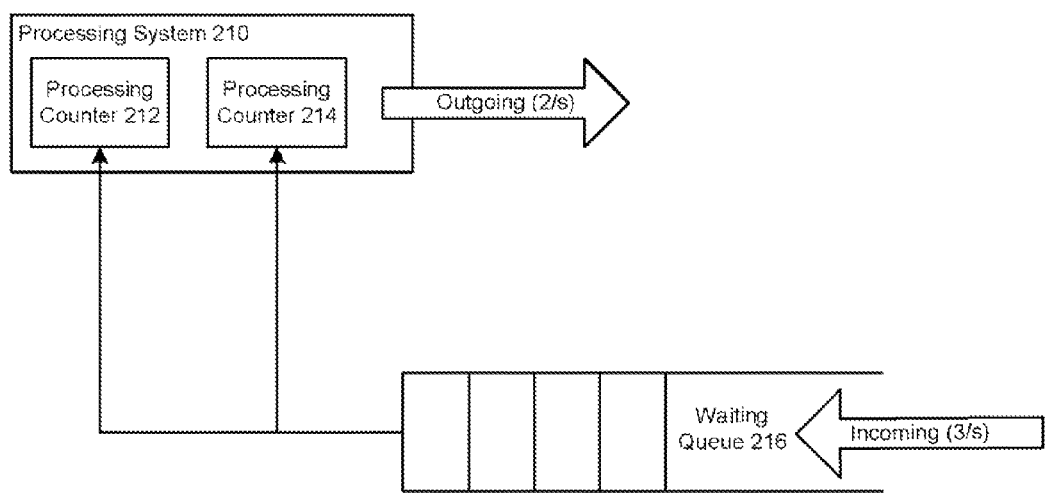
FIG. 4 is another illustration of measuring efficiency and/or inefficiency, in accordance with various embodiments of the invention.
Figure 5:
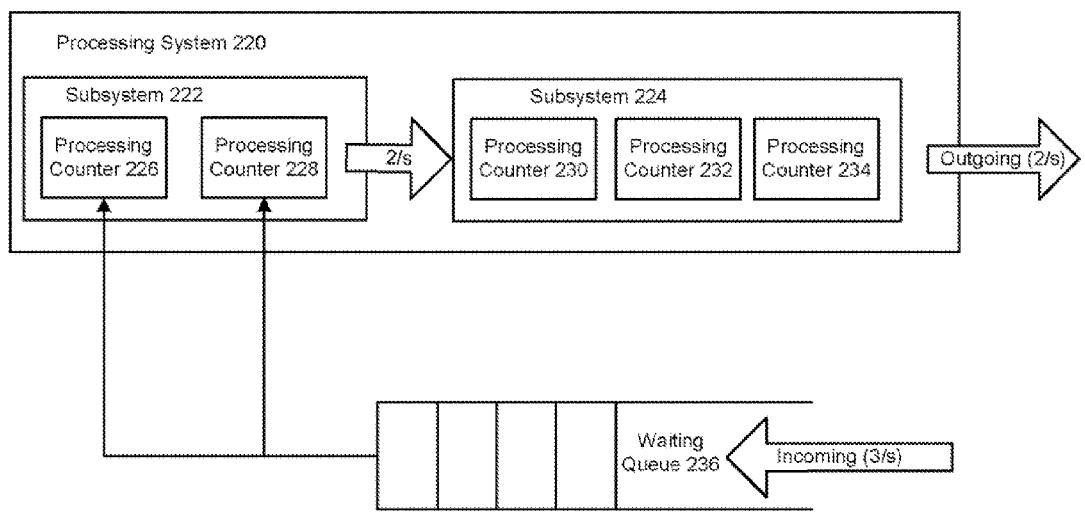
FIG. 5 is another illustration of measuring efficiency and/or inefficiency, in accordance with various embodiments of the invention.

FIGS. 3-5 are illustrations of measuring efficiency and/or inefficiency, in accordance with various embodiments of the invention. Although these diagrams depict components as logically separate, such depiction is merely for illustrative purposes. It will be apparent to those skilled in the art that the components portrayed in these figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Illustrated in FIG. 3 is the processing capability of a system 200 having a set of three counters 202, 204 and 206. If each counter in a processing system takes 1 second to process an application, then the outgoing rate is 3 applications per second. If the incoming requests in the waiting queue 208 are at the rate of 3 applications per second, then every second the next 3 requests arrive, 3 counters are available to process the application. Hence the efficiency of the system can be defined as 3/3=1 and inefficiency is 0/3=0.

FIG. 4 is an illustration of a similar scenario where it takes 1 s to process an application, however, in this case there are only 2 counters (212, 214) in the processing system 210. In this scenario, only 2 applications are processed for every 3 applications that come in at any given time. So, the processing power (i.e. efficiency) is 2/3=0.66 and the retention power (i.e. inefficiency) of the system is 1/3=0.33.

In FIGS. 3-4, the sampling period is every 1 second. If one considers a situation where the rate of incoming applications is @5applications/s and processing time is 0.6 s per application. When sampled every 1 s, the efficiency will be 2/5=0.4, 3 s will be 10/15=0.66, 6 s will be 20/30=0.66, 9 s will be 30/45=0.66, when sampled every 5 s, 10 s, the efficiency will be 16/25=0.64. If instead, the system is sampled every 7 s, the efficiency will be 22/35=0.62 and so on. As evident from the above, based on the resonance of the processing time to the sampling time the efficiency varies and hence increases or decreases the margin of error involved in detecting a problem. Hence, in accordance with an embodiment, selecting a proper sampling time is important for the proper problem detection. The best approach to this is to keep the sampling time comparable to the expected processing time, so that it does not go beyond 2 intervals of processing time. Therefore in the above situation, the sampling time should be less than 0.6 s*2=1.2 s It should be noted that typically any wait in a middleware system need not necessarily be bad. Only when a wait starts affecting the overall performance of the system will a wait be considered bad. So, if we consider the first scenario explained since it is in perfect balance, the response time for any application is just 1 s, while in the second scenario, since every application has a wait of 1 s except the first two applications all other applications in a steady flow will get processed within the next 2 s.

If 2 s processing time meets the SLA requirements for the processing system, then the 1 s wait is not really a problem.

FIG. 5 is an illustration of determining efficiency/inefficiency in a system that includes several sub-systems, in accordance with various embodiments of the invention.

As illustrated, if there were more than one subsystem (222, 224) processing the same application, then the efficiency of the whole system 220 is equal to the efficiency of the slowest sub system 222. Thus, in this illustration, even though the second sub system 224 has 3 counters (230, 232, 234) to process the request, the outgoing of the whole system will be only 2 applications per second. This is because the first subsystem 222 only has 2 counters (226 and 228) to process the request. Hence the efficiency of the whole system will be reduced to 0.67.

Thus, in accordance with an embodiment, when a middleware system has a number of sub systems working together in conjunction to service a request, the overall efficiency of the system will be reduced to the efficiency of the slowest component in it. So, if the efficiency of the middleware system reduces less than the expected efficiency, then the problem reduces to search for the component or components that are exhibiting efficiencies less than the expected efficiency and mark them in problem.

In the system shown in FIG. 5, if the load that comes into the system is 1 application/s or 2 applications/s, and the processing power is 2 applications/s, then the system is capable of handling it and observed outgoing will be 1 application/s or 2 application/s and hence we will get an efficiency of 1 and no problem will be detected.

When the load that comes into the system is 3 applications/s or more, however, the system will not be able to handle it with an efficiency of 1 and the efficiency will start reducing. So, while the calculation itself is independent of load, it starts indicating problems when the system cannot process the load that is arriving to the system.

If this is viewed from the perspective of response time, but instead of 1 application/s, the sub system took 1 application/2 s to process, then the system is able to handle only a rate of load of 2 applications/2 s or can only handle 1 application/s and hence the efficiency automatically reduces. Hence it is evident that efficiency is computed based on response time, load and throughput and can be used to compare across sub systems.

It is quite possible that one request at the top level evolved into 2 requests into a sub system, yet the measurement would remain common. If the sub system involved cannot handle double the load coming into the system, then the processing power will fall only for that sub system and be highlighted as a problem.

Thus, in accordance with an embodiment, using efficiency helps to set a common threshold for all sub systems involved without worrying about the various scales of measurement of response times in each of the subsystem. It provides the isolation from load and response time, by proportionally showing up only if there is a problem.

Figure 6:
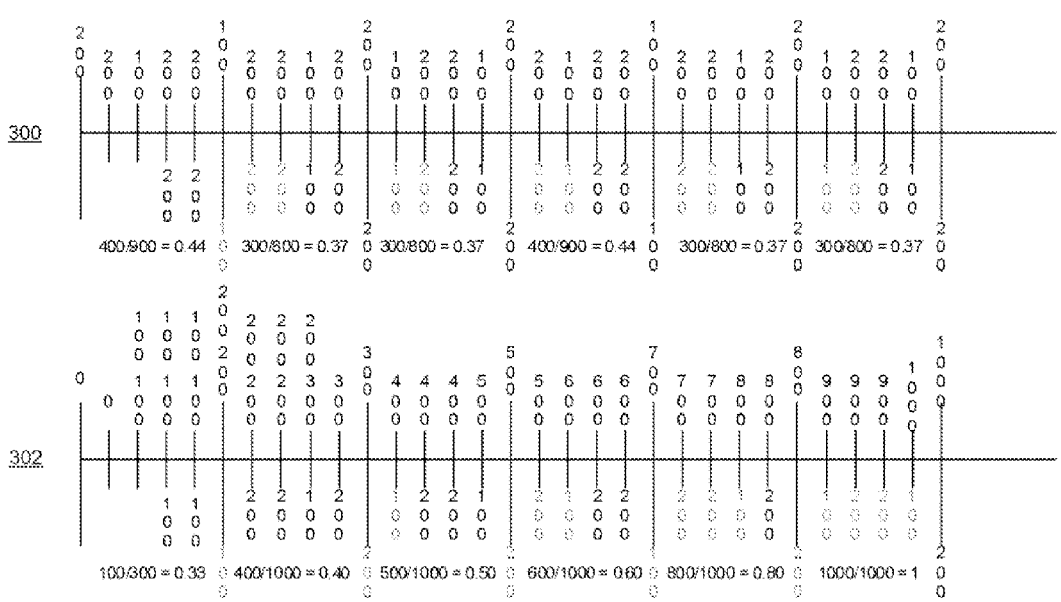
FIG. 6 is an illustration of several charts during an efficiency calculation, in accordance with various embodiments of the invention.

FIG. 6 is an illustration of several charts during an efficiency calculation, in accordance with various embodiments of the invention. It should be noted that this chart illustrates a specific example with specific variables, processing times and pool size, and is not intended to be in any way limiting of the invention. It will be evident to one of ordinary skill in the art, that many variations of such a chart are possible within the scope of the present invention.

FIG. 6 illustrates a system with a Java Database Connectivity (JDBC) pool size of five hundred, wherein the system receives two hundred incoming requests per second. The actual execution time of the requests in this particular illustration is three seconds and the efficiency calculation time interval is five seconds. Each line in both charts 300 and 302 indicates a one second time interval.

Chart 300 illustrates the efficiency calculated at each five second sampling period with reference to what occurs every one second with respect to the pool size and processing in the system. The top number on chart 300 shows the number of requests that begin to be processed and the bottom number shows the requests that complete processing.

More specifically, in the first second of chart 300, two hundred requests have come in for processing. Because the pool capacity is five hundred, all two hundred requests immediately begin to be processed by the system. These two hundred requests will take three seconds to complete processing. In the next second, another two hundred requests have come in and since the available pool capacity is now three hundred, once again, all two hundred new incoming requests immediately begin to be processed. In the third second, once again two hundred new requests are received. However, at that point, the JDBC available pool capacity is only one hundred since the four hundred requests received during the first two seconds still have not completed processing. Thus, in the third second, the system will only begin processing one hundred of the two hundred new requests received. The other one hundred requests will be queued for later processing.

By the fourth second mark, the first two hundred requests (received in the first second) have completed processing and the pool size is now freed up by two hundred and can immediately begin to process the next two hundred requests. Similarly, by the fifth second, two hundred more requests have completed processing and the pool size is once again freed up to process two hundred more requests. As evident from the chart, during the first five second sampling period, four hundred of the nine hundred requests have been processed and therefore the efficiency of execution is 0.44. Similarly during the next intervals, the efficiency of execution is 0.37, 0.37, 0.44, 0.37, 0.37 in that sequence.

Continuing with FIG. 6, chart 302 is an illustration of the pool back log at the JDBC pool. As shown in the first second, the pool capacity is five hundred and thus, when the first two hundred requests come in, there is no back log. Similarly, in the second two, the pool capacity is still enough to handle all incoming requests and the pool back log is still zero. However, in the third second, the pool capacity is only one hundred and thus there is created a back log of one hundred requests.

On the fourth second mark, the first two hundred requests have finished processing and therefore the pool capacity is freed up to process two hundred more requests. At this point, the pool will process the one hundred requests in the back log, plus one hundred of the two hundred new requests and the remaining new one hundred requests will be placed in the back log. This process continues, with the backlog continuing to increase. As illustrated, in FIG. 6, the computed inefficiency continues to increase as well, from 0.33 in the first five second sampling interval, all the way up to 1 in the last interval illustrated.

Figure 7:
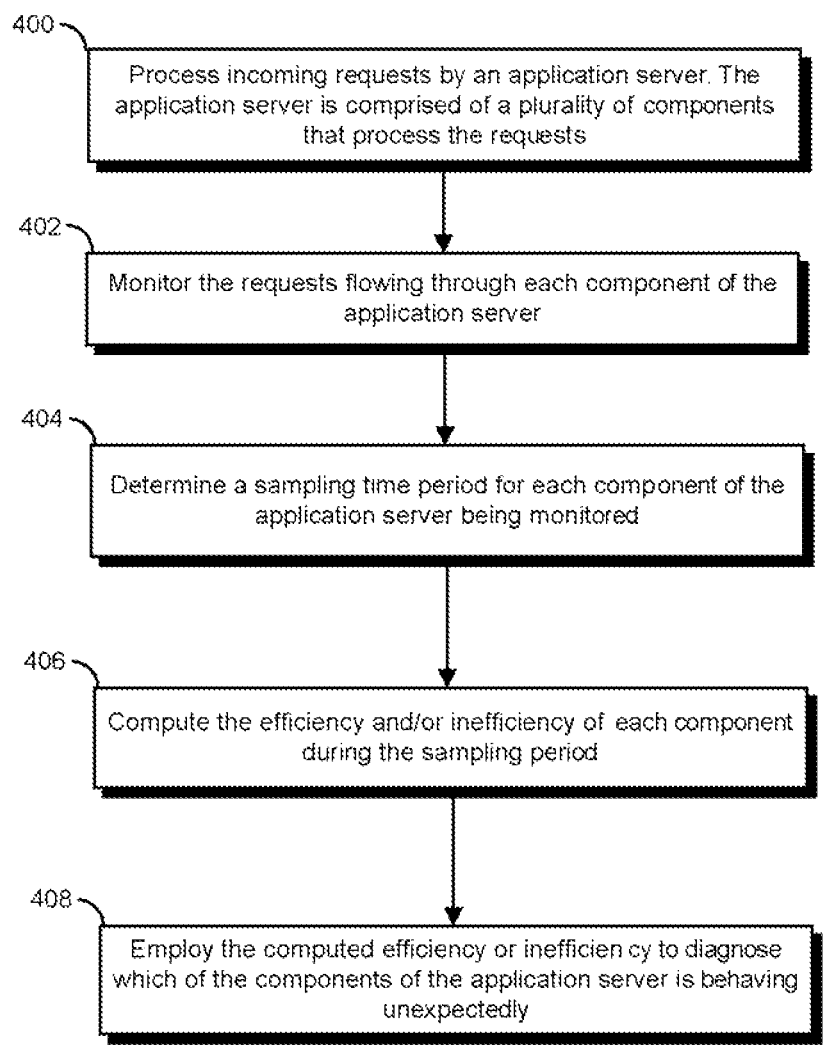
FIG. 7 is a flow chart of a process for measuring and diagnosing misbehaviors in a software system, in accordance with various embodiments of the invention.

FIG. 7 is a flow chart of a process for measuring and diagnosing misbehaviors in a software system, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 400, a middleware system, such as an application server may be continuously processing incoming requests from various clients. In accordance with an embodiment, the application server is comprised of a plurality of resources or components that are invoked to process the incoming requests. In step 402, the incoming requests are monitored on the application server. This can be performed via the use of a middleware diagnostics advisor that is integrated into the application server or deployed alongside it. In step 404, the diagnostics advisor determines a sampling time period for the one or more components. The sampling time period can vary but can be selected according to an expected processing time taken by the components of the system. In accordance with one embodiment, the sampling period should be comparable to the expected processing time of the components to process the request such that it is limited to two or less intervals of the expected processing time.

In step 406, the diagnostics advisor determines an efficiency of the components of the application server. In accordance with an embodiment, the efficiency is determined by computing a ratio of a number of requests that completed execution in the server components during the sampling period to the requests that were received by the components during that time period. Subsequently, the diagnostics advisor can employ the determined efficiency to diagnose a misbehavior of the one or more components of the software system.

The present invention can be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for diagnosing behavior of software components, said method comprising:
    monitoring a plurality of requests being processed by one or more components of a software system;
    determining, at a diagnostic advisor,
        a sampling time period for the one or more components based on an expected processing time of the one or more components to process one of the requests, and
        an efficiency of the one or more components by computing a ratio of a number of requests that completed execution in the one or more components during the sampling time period to the number of requests that were received by the one or more components during the sampling time period;
    defining a plurality of current system behaviors with a static model of the plurality of requests' behaviors; and
    combining the determined efficiency, the static model, and a runtime model of at least one of the components that exhibit performance problems to diagnose, at the diagnostic advisor, a misbehavior of the one or more components of the software system.

2. The method of claim 1, further comprising:
    determining an inefficiency of the one or more components by computing a ratio of the number of requests that are still being executed by the one or more components at the end of the sampling time period to the number of requests that were received by the one or more components during the sampling time period; and
    employing the determined inefficiency to diagnose said misbehavior of the one or more software components.

3. The method of claim 2, wherein, depending on a category of the component being monitored, one of either the efficiency or said inefficiency is employed to diagnose said misbehavior.

4. The method of claim 1, wherein the software system includes a plurality of said components and wherein the efficiency is used to determine which of said plurality of components is causing latency in the software system.

5. The method of claim 1, wherein determining the sampling time period for the one or more components further includes:
    maintaining the sampling time period comparable to an expected processing time of said one or more components to process a request, wherein the sampling time period is limited to two or less intervals of said processing time.

6. The method of claim 1, wherein the one or more components include designated points in an application server to monitor one or more of the following:
    average time waiting for a thread pool;
    average time waiting for an Enterprise JavaBean (EJB);
    time spent during execution of said EJB;
    average time waiting for a Java Database Connectivity (JDBC) connection pool; and
    time spent during JDBC execution.

7. The method of claim 1, wherein as a deviation of resonance of the sampling period increases from an expected processing time of said one or more components, the margin of error in detecting performance degradation increases.

8. A system for diagnosing behavior of software components, said system comprising:
   an application server comprising a plurality of components that process requests incoming to the application server; and
   a diagnostics advisor that determines
      a sampling time period for the one or more components based on an expected processing time of the one or more components to process one of the requests, and
      an efficiency of at least one of the plurality of components of the application server by computing a ratio of a number of requests that completed execution in the component during the sampling time period to the number of requests that were received by the at least one components during the sampling time period;
   a static model of the plurality of requests' behaviors that defines a plurality of current system behaviors; and
   wherein the diagnostics advisor combines the determined efficiency, the static model, and a runtime model of at least one of the components that exhibit performance problems to diagnose, at the diagnostic advisor, a misbehavior of at least one of the components of the application server.

9. The system of claim 8, wherein:
   the diagnostics advisor determines an inefficiency of at least one of the plurality of components by computing a ratio of the number of requests that are still being executed by the component at the end of the sampling time period to the number of requests that were received by the component during the sampling time period; and
   wherein the diagnostics advisor employs the determined inefficiency to diagnose said misbehavior of the at least one of the software components.

10. The system of claim 9, wherein, depending on a category of the component being monitored, one of either the efficiency or said inefficiency is employed to diagnose said misbehavior.

11. The system of claim 8, wherein the efficiency is used to determine which of said plurality of components is causing latency in the software system.

12. The system of claim 8, wherein the diagnostics advisor determines the sampling time period for the component by maintaining the sampling time period comparable to an expected processing time of said one or more components to process a request, wherein the sampling time period is limited to two or less intervals of said processing time.

13. The system of claim 8, wherein the plurality of components include designated points in the application server to monitor one or more of the following:
   average time waiting for a thread pool;
   average time waiting for an Enterprise JavaBean (EJB);
   time spent during execution of said EJB;
   average time waiting for a Java Database Connectivity (JDBC) connection pool; and
   time spent during JDBC execution.

14. The system of claim 8, wherein as a deviation of resonance of the sampling period increases from an expected processing time of said one or more components, the margin of error in detecting performance degradation increases.

15. A non-transitory computer readable storage medium storing one or more sequences of instructions, said instructions when executed by one or more processors, causing the one or more processors to perform the steps comprising:
   monitoring a plurality of requests being processed by one or more components of a software system;
   determining, at a diagnostic advisor,
      a sampling time period for the one or more components based on an expected processing time of the one or more components to process one of the requests, and
      determining an efficiency of the one or more components by computing a ratio of a number of requests that completed execution in the one or more components during the sampling time period to the number of requests that were received by the one or more components during the sampling time period; and
   combining the determined efficiency, the static model, and a runtime model of at least one of the components that exhibit performance problems to diagnose, at the diagnostic advisor, a misbehavior of the one or more components of the software system.

16. The non-transitory computer readable storage medium of claim 15, further comprising instructions for:
   determining an inefficiency of the one or more components by computing a ratio of the number of requests that are still being executed by the one or more components at the end of the sampling time period to the number of requests that were received by the one or more components during the sampling time period; and
   employing the determined inefficiency to diagnose said misbehavior of the one or more software components.

17. The non-transitory computer readable storage medium of claim 16, wherein, depending on a category of the component being monitored, one of either the efficiency or said inefficiency is employed to diagnose said misbehavior.

18. The non-transitory computer readable storage medium of claim 15, wherein the software system includes a plurality of said components and wherein the efficiency is used to determine which of said plurality of components is causing latency in the software system.

19. The non-transitory computer readable storage medium of claim 15, wherein determining the sampling time period for the one or more components further includes:
   maintaining the sampling time period comparable to an expected processing time of said one or more components to process a request, wherein the sampling time period is limited to two or less intervals of said processing time.

20. The non-transitory computer readable storage medium of claim 15, wherein the one or more components include designated points in an application server to monitor one or more of the following:
   average time waiting for a thread pool;
   average time waiting for an Enterprise JavaBean (EJB);
   time spent during execution of said EJB;
   average time waiting for a Java Database Connectivity (JDBC) connection pool; and
   time spent during JDBC execution.

\* \* \* \* \*

UNITED STATES PATENT AND TRADEMARK OFFICE
CERTIFICATE OF CORRECTION

PATENT NO. : 8,631,280 B2  Page 1 of 1
APPLICATION NO. : 13/009777
DATED : January 14, 2014
INVENTOR(S) : Sankar et al.

It is certified that error appears in the above-identified patent and that said Letters Patent is hereby corrected as shown below:

In the Drawings

On sheet 7 of 7, in figure 7, under reference numeral 408, line 1, delete "inefficien cy" and insert -- inefficiency --, therefor.

In the Specification

In column 2, line 35-36, delete "components/resource" and insert -- components/resource. --, therefor.

Signed and Sealed this
Eighth Day of July, 2014

Michelle K. Lee
*Deputy Director of the United States Patent and Trademark Office*